United States Patent
Nigam et al.

(10) Patent No.: US 7,725,414 B2
(45) Date of Patent: May 25, 2010

(54) METHOD FOR DEVELOPING A CLASSIFIER FOR CLASSIFYING COMMUNICATIONS

(75) Inventors: Kamal P. Nigam, Pittsburgh, PA (US); Robert G. Stockton, Swissvale, PA (US)

(73) Assignee: Buzzmetrics, Ltd an Israel corporation, Herzlia Pitusch (IL)

( * ) Notice: Subject to any disclaimer, the term of this patent is extended or adjusted under 35 U.S.C. 154(b) by 1169 days.

(21) Appl. No.: 10/801,758

(22) Filed: Mar. 16, 2004

(65) Prior Publication Data

US 2005/0210065 A1    Sep. 22, 2005

(51) Int. Cl.
   *G06N 5/04* (2006.01)
(52) U.S. Cl. .............................. 706/45; 706/46; 706/62; 715/700; 715/701
(58) Field of Classification Search .............. 706/10–12, 706/14, 16–20, 45–48; 382/155–159, 224–225; 715/700, 701, 748
   See application file for complete search history.

(56) References Cited

U.S. PATENT DOCUMENTS

| | | | |
|---|---|---|---|
| 3,950,618 | A | 4/1976 | Bloisi |
| 5,041,972 | A | 8/1991 | Frost |
| 5,077,785 | A | 12/1991 | Monson |
| 5,124,911 | A | 6/1992 | Sack |
| 5,301,109 | A | 4/1994 | Landauer et al. |

(Continued)

FOREIGN PATENT DOCUMENTS

EP    1052582    11/2000

WO    00/17824    3/2000

OTHER PUBLICATIONS

Cohn et al., Active Learning with Statistical Models, Journal of Artificial Intelligence Research 4 (1996), 129-145, AI Access Foundation and Morgan Kaufmann Publishers, USA.

(Continued)

*Primary Examiner*—David R Vincent
*Assistant Examiner*—Omar F Fernandez Rivas
(74) *Attorney, Agent, or Firm*—Hanley Flight & Zimmerman, LLC

(57) ABSTRACT

A computer assisted/implemented method for developing a classifier for classifying communications includes roughly four stages, where these stages are designed to be iterative: (1) a stage defining where and how to harvest messages (i.e., from Internet message boards, ews groups and the like), which also defines an expected domain of application for the lassifier; (2) a guided question/answering stage for the computerized tool to elicit the user's criteria for determining whether a message is relevant or irrelevant; (3) a labeling stage where the user examines carefully-selected messages and provides feedback about whether or not it is relevant and sometimes also what elements of the criteria were used to make the decision; and (4) a performance evaluation stage where parameters of the classifier training are optimized, the best classifier is produced, and known performance bounds are calculated. In the guided question/answering stage, the criteria are parameterized in such a way that (a) they can be operationalized into the text classifier through key words and phrases, and (b) a human-readable criteria can be produced, which can be reviewed and edited. The labeling phase is oriented toward an extended Active Learning framework. That is, the exemplary embodiment decides which example messages to show the user based upon what category of messages the system thinks would be most useful to the Active Learning process.

50 Claims, 9 Drawing Sheets

U.S. PATENT DOCUMENTS

| | | | |
|---|---|---|---|
| 5,317,507 A | 5/1994 | Gallant | |
| 5,321,833 A | 6/1994 | Chang et al. | |
| 5,371,673 A | 12/1994 | Fan | |
| 5,495,412 A | 2/1996 | Thiessen | |
| 5,519,608 A | 5/1996 | Kupiec | |
| 5,537,618 A | 7/1996 | Boulton et al. | |
| 5,659,732 A | 8/1997 | Kirsch | |
| 5,659,742 A | 8/1997 | Beattie et al. | |
| 5,668,953 A | 9/1997 | Sloo | |
| 5,671,333 A | 9/1997 | Catlett et al. | |
| 5,675,710 A * | 10/1997 | Lewis | 706/12 |
| 5,696,962 A | 12/1997 | Kupiec | |
| 5,761,383 A * | 6/1998 | Engel et al. | 706/14 |
| 5,794,412 A | 8/1998 | Ronconi | |
| 5,819,285 A | 10/1998 | Damico et al. | |
| 5,822,744 A | 10/1998 | Kesel | |
| 5,836,771 A | 11/1998 | Ho et al. | |
| 5,845,278 A | 12/1998 | Kirsch et al. | |
| 5,857,179 A | 1/1999 | Vaithyanathan et al. | |
| 5,884,302 A | 3/1999 | Ho | |
| 5,895,450 A | 4/1999 | Sloo | |
| 5,911,043 A | 6/1999 | Duffy et al. | |
| 5,920,854 A | 7/1999 | Kirsch et al. | |
| 5,924,094 A | 7/1999 | Sutter | |
| 5,950,172 A | 9/1999 | Klingman | |
| 5,950,189 A | 9/1999 | Cohen et al. | |
| 5,953,718 A | 9/1999 | Wical | |
| 5,974,412 A | 10/1999 | Halehurst et al. | |
| 5,983,214 A | 11/1999 | Lang et al. | |
| 5,983,216 A | 11/1999 | Kirsch et al. | |
| 6,006,221 A | 12/1999 | Liddy et al. | |
| 6,012,053 A | 1/2000 | Pant et al. | |
| 6,021,409 A | 2/2000 | Burrows | |
| 6,026,387 A | 2/2000 | Kesel | |
| 6,026,388 A | 2/2000 | Liddy et al. | |
| 6,029,161 A | 2/2000 | Lang et al. | |
| 6,029,195 A | 2/2000 | Herz | |
| 6,032,145 A | 2/2000 | Beall et al. | |
| 6,035,294 A | 3/2000 | Fish | |
| 6,038,610 A | 3/2000 | Belfiore et al. | |
| 6,064,980 A | 5/2000 | Jacobi et al. | |
| 6,067,539 A | 5/2000 | Cohen | |
| 6,078,892 A | 6/2000 | Anderson et al. | |
| 6,094,657 A | 7/2000 | Hailpern et al. | |
| 6,098,066 A | 8/2000 | Snow et al. | |
| 6,112,203 A | 8/2000 | Bharat et al. | |
| 6,119,933 A | 9/2000 | Wong | |
| 6,138,113 A | 10/2000 | Dean et al. | |
| 6,138,128 A | 10/2000 | Perkowitz et al. | |
| 6,169,986 B1 | 1/2001 | Bowman et al. | |
| 6,185,558 B1 | 2/2001 | Bowman et al. | |
| 6,192,360 B1 | 2/2001 | Dumais et al. | |
| 6,202,068 B1 | 3/2001 | Kraay et al. | |
| 6,233,575 B1 | 5/2001 | Agrawal | |
| 6,236,977 B1 | 5/2001 | Verba et al. | |
| 6,236,987 B1 | 5/2001 | Horowitz et al. | |
| 6,236,991 B1 | 5/2001 | Frauenhofer et al. | |
| 6,260,041 B1 | 7/2001 | Gonzalez | |
| 6,266,664 B1 | 7/2001 | Russell-Falla et al. | |
| 6,269,362 B1 | 7/2001 | Broder et al. | |
| 6,278,990 B1 | 8/2001 | Horowitz | |
| 6,289,342 B1 | 9/2001 | Lawrence et al. | |
| 6,304,864 B1 | 10/2001 | Liddy et al. | |
| 6,308,176 B1 | 10/2001 | Bagshaw | |
| 6,314,420 B1 | 11/2001 | Lang et al. | |
| 6,334,131 B2 | 12/2001 | Chakrabarti et al. | |
| 6,360,215 B1 | 3/2002 | Judd et al. | |
| 6,362,837 B1 | 3/2002 | Ginn | |
| 6,366,908 B1 | 4/2002 | Chong et al. | |
| 6,377,946 B1 | 4/2002 | Okamoto et al. | |
| 6,385,586 B1 | 5/2002 | Dietz | |
| 6,393,460 B1 | 5/2002 | Gruen et al. | |
| 6,401,118 B1 | 6/2002 | Thomas | |
| 6,411,936 B1 | 6/2002 | Sanders | |
| 6,418,433 B1 | 7/2002 | Chakrabarti et al. | |
| 6,421,675 B1 | 7/2002 | Ryan et al. | |
| 6,434,549 B1 | 8/2002 | Linetsky et al. | |
| 6,493,703 B1 | 12/2002 | Knight et al. | |
| 6,507,866 B1 | 1/2003 | Barchi | |
| 6,513,032 B1 | 1/2003 | Sutter | |
| 6,519,631 B1 | 2/2003 | Rosenschein et al. | |
| 6,526,440 B1 | 2/2003 | Bharat | |
| 6,539,375 B2 | 3/2003 | Kawasaki | |
| 6,546,390 B1 | 4/2003 | Pollack et al. | |
| 6,553,358 B1 * | 4/2003 | Horvitz | 706/45 |
| 6,571,234 B1 | 5/2003 | Knight et al. | |
| 6,571,238 B1 | 5/2003 | Pollack et al. | |
| 6,574,614 B1 | 6/2003 | Kesel | |
| 6,584,470 B2 | 6/2003 | Veale | |
| 6,606,644 B1 | 8/2003 | Ford et al. | |
| 6,622,140 B1 | 9/2003 | Kantrowitz | |
| 6,640,218 B1 | 10/2003 | Golding et al. | |
| 6,651,086 B1 | 11/2003 | Manber et al. | |
| 6,654,813 B1 | 11/2003 | Black et al. | |
| 6,658,389 B1 | 12/2003 | Alpdemir | |
| 6,662,170 B1 * | 12/2003 | Dom et al. | 706/45 |
| 6,708,215 B1 | 3/2004 | Hingorani et al. | |
| 6,721,734 B1 | 4/2004 | Subasic et al. | |
| 6,751,606 B1 * | 6/2004 | Fries et al. | 707/3 |
| 6,751,683 B1 | 6/2004 | Johnson et al. | |
| 6,757,646 B2 | 6/2004 | Marchisio | |
| 6,772,141 B1 | 8/2004 | Pratt et al. | |
| 6,775,664 B2 | 8/2004 | Lang et al. | |
| 6,778,975 B1 | 8/2004 | Anick et al. | |
| 6,782,393 B1 | 8/2004 | Balabanovic et al. | |
| 6,795,826 B2 | 9/2004 | Flinn et al. | |
| 6,807,566 B1 | 10/2004 | Bates et al. | |
| 6,928,526 B1 | 8/2005 | Zhu et al. | |
| 6,978,292 B1 | 12/2005 | Murakami et al. | |
| 6,983,320 B1 | 1/2006 | Thomas | |
| 6,999,914 B1 | 2/2006 | Boerner et al. | |
| 7,146,416 B1 | 12/2006 | Yoo | |
| 7,188,078 B2 | 3/2007 | Arnett et al. | |
| 7,188,079 B2 | 3/2007 | Arnett et al. | |
| 7,197,470 B1 | 3/2007 | Arnett et al. | |
| 7,277,919 B1 | 10/2007 | Donoho | |
| 2001/0042087 A1 * | 11/2001 | Kephart et al. | 707/530 |
| 2002/0010691 A1 * | 1/2002 | Chen | 706/20 |
| 2002/0032772 A1 | 3/2002 | Olstad et al. | |
| 2002/0059258 A1 | 5/2002 | Kirkpatrick | |
| 2002/0087515 A1 | 7/2002 | Swannack | |
| 2002/0123988 A1 | 9/2002 | Dean et al. | |
| 2002/0133481 A1 | 9/2002 | Smith et al. | |
| 2002/0159642 A1 * | 10/2002 | Whitney | 382/225 |
| 2003/0070338 A1 | 4/2003 | Roshkoff | |
| 2003/0088532 A1 * | 5/2003 | Hampshire, II | 706/16 |
| 2004/0024752 A1 | 2/2004 | Manber et al. | |
| 2004/0059708 A1 | 3/2004 | Dean et al. | |
| 2004/0059729 A1 | 3/2004 | Krupin et al. | |
| 2004/0078432 A1 | 4/2004 | Manber et al. | |
| 2004/0111412 A1 | 6/2004 | Broder | |
| 2004/0122811 A1 | 6/2004 | Page | |
| 2004/0199498 A1 | 10/2004 | Kapur et al. | |
| 2004/0205482 A1 * | 10/2004 | Basu et al. | 715/500.1 |
| 2004/0210561 A1 | 10/2004 | Shen | |
| 2005/0049908 A2 | 3/2005 | Hawks | |
| 2005/0114161 A1 | 5/2005 | Garg | |
| 2005/0125216 A1 | 6/2005 | Chitrapura et al. | |
| 2005/0154686 A1 | 7/2005 | Corston et al. | |
| 2006/0004691 A1 | 1/2006 | Sifry | |
| 2006/0041605 A1 | 2/2006 | King et al. | |
| 2006/0069589 A1 | 3/2006 | Nigam et al. | |
| 2006/0173819 A1 | 8/2006 | Watson | |
| 2006/0173837 A1 | 8/2006 | Berstis et al. | |

| | | |
|---|---|---|
| 2006/0206505 A1 | 9/2006 | Hyder et al. |
| 2007/0027840 A1 | 2/2007 | Cowling et al. |

OTHER PUBLICATIONS

Freund et al., Selective Sampling Using the Query by Committee Algorithm, Machine Learning 28 (1997), 133-168, Kluwer Academic Publishers, The Netherlands.

McCallum et al, Text Classification by Bootstrapping with the Keywords, EM and Shrinkage, Just Research and Carnegie Mellon U., circa 1999, Pittsburgh, PA, USA.

Reguly, Eric. "Caveat Emptor Rules on the Internet." The Globe and Mail (Canada): Report on Business Column, p. B2, Apr. 10, 1999.

Office Action issued in U.S. Appl. No. 11/651,661, mailed May 19, 2009, 29 pages.

Office Action issued in U.S. Appl. No. 11/517,417, mailed May 29, 2009, 7 pages.

Office Action issued in U.S. Appl. No. 11/710,742, mailed Jun. 8, 2009, 10 pages.

Office Action issued in U.S. Appl. 11/710,743, mailed Jul. 29, 2008, 12 pages.

Official Action dated Oct. 8, 2008, in U.S. Appl. No. 11/245,542, 5 pages.

Official Action dated Oct. 9, 2007, in U.S. Appl. No. 11/245,542, 11 pages.

Official Action dated Sep. 12, 2007, in U.S. Appl. No. 11/239,696, 8 pages.

Official Action dated Sep. 18, 2008, in U.S. Appl. No. 11/454,301, 17 pages.

Official Action dated Jan. 12, 2009, in U.S. Appl. No. 11/710,743, 17 pages.

Official Action dated Dec. 17, 2008, in U.S. Appl. No. 11/517,417, 6 pages.

Written Opinion of the International Searching Authority, issued in corresponding application No. PCT/US2007/021035, mailed Apr. 9, 2009, 9 pages.

International Search Report dated Jul. 1, 2008, in WO PCT/US2007/021035, 3 pages.

Interview Summary in U.S. Appl. No. 11/651,661, date mailed May 6, 2009, 2 pages.

IPRP dated Jun. 19, 2007, in WO PCT/US2005/035321, 4 pages.

David Chaum & Jan-Hendrik Evertse, "A Secure and Privacy-Protecting Protocol for Transmitting Personal Information Between Organizations", A.M. Odlyzko (Ed.): Advances in Cryptology, CRYPTO '86, LNCS 263, 1987, pp. 118-167.

David L. Chaum, "Untraceable Electronic Mail, Return Addresses, and Digital Pseudonymns", Communication of the ACM, vol. 24, No. 2, 1981, pp. 84-88.

European Search Report dated Sep. 26, 2007, directed to counterpart EP application No. 02744622.8, 3 pages.

Housley et al., "Internet X.509 Public Key Infrastructure Certificate and CRL Profile", Jan. 1999, Network Working Group Request for Comments: 2459, pp. 1-129.

Official Action dated Apr. 7, 2009, in U.S. Appl. No. 11/454,301, 17 pages.

Official Action dated Apr. 23, 2008, in U.S. Appl. No. 11/364,169, 10 pages.

Official Action dated Apr. 28, 2005, in U.S. Appl. No. 09/879,220, 16 pages.

Official Action dated Nov. 2, 2005, in U.S. Appl. No. 09/695,016, 13 pages.

Official Action dated Apr. 5, 2006, in U.S. Appl. No. 11/239,632, 9 pages.

Official Action dated Apr. 7, 2006, in U.S. Appl. No. 11/239,695, 9 pages.

Official Action dated Aug. 19, 2008, in U.S. Appl. No. 11/517,418, 9 pages.

Official Action dated Aug. 21, 2008, in U.S. Appl. No. 11/245,542, 4 pages.

Official Action dated Aug. 3, 2007, in U.S. Appl. No. 11/651,661, 14 pages.

Official Action dated Aug. 7, 2008, in U.S. Appl. No. 11/710,742, 12 pages.

Official Action dated Dec. 1, 2006, in U.S. Appl. No. 09/879,220, 3 pages.

Official Action dated Dec. 2, 2004, in U.S. Appl. No. 09/879,220, 15 pages.

Official Action dated Dec. 16, 2008, in U.S. Appl. No. 11/245,542, 4 pages.

Official Action dated Dec. 18, 2006, in U.S. Appl. No. 11/239,632, 3 pages.

Official Action dated Dec. 23, 2008, in U.S. Appl. No. 11/372,191, 6 pages.

Official Action dated Dec. 3, 2006, in U.S. Appl. No. 11/239,695, 3 pages.

Official Action dated Dec. 4, 2008, in U.S. Appl. No. 11/651,661, 10 pages.

Official Action dated Dec. 8, 2008, in U.S. Appl. No. 11/710,742, 10 pages.

Official Action dated Feb. 24, 2003, in U.S. Appl. No. 09/796,961, 4 pages.

Official Action dated Jan. 24, 2007, in U.S. Appl. No. 09/686,516, 3 pages.

Official Action dated Jan. 28, 2005, in U.S. Appl. No. 09/686,516, 19 pages.

Official Action dated Jan. 30, 2009, in U.S. Appl. No. 11/710,742, 10 pages.

Official Action dated Jul. 10, 2008, in U.S. Appl. No. 11/364,169, 2 pages.

Official Action dated Jul. 21, 2004, in U.S. Appl. No. 09/695,016, 27 pages.

Official Action dated Sep. 21, 2006, in U.S. Appl. No. 11/239,632, 3 pages.

Official Action dated Jun. 11, 2007, in U.S. Appl. No. 11/364,169, 8 pages.

Official Action dated Jun. 12, 2008, in U.S. Appl. No. 11/245,542, 9 pages.

Official Action dated Jun. 29, 2005, in U.S. Appl. No. 09/686,516, 21 pages.

Official Action dated Jun. 4, 2008, in U.S. Appl. No. 11/651,661, 11 pages.

Official Action dated Mar. 28, 2006, in U.S. Appl. No. 09/879,220, 19 pages.

Official Action dated May 10, 2006, in U.S. Appl. No. 09/686,516, 34 pages.

Official Action dated May 19, 2005, in U.S. Appl. No. 09/695,016, 13 pages.

Aliod, Diego Molla, et al., "A Real World Implementation of Answer Extraction", Department of Computer Science, University of Zurich, Winterthurerstr., 1998, 190, CH-8057 Zurich, Switzerland, pp. 1-6.

Bishop, Mike, "ARROW Question/Answering Systems", Language Computer Corporation, 1999, pp. 1-3.

Blum, Avrim, "Empirical support for winow and weighted-majority algorithms: Results on a calendar scheduling domain," in Machine Learning, 1997, pp. 5-23, vol. 26, Kluwer Academic Publishers, Boston, USA.

Bournellis, Cynthia, "Tracking the hits on Web Sites", Communications International. London: Sep. 1995. vol. 22, Issue 9, 3 pages.

Cohen, William W., "Data Integration using similarity joins and a word-based information representation language," in ACM Transactions on Information Systems, Jul. 2000, pp. 288-321, vol. 18, No. 3.

Delahaye Group to Offer Net Bench: High Level Web-Site Qualitative Analysis and Reporting; Netbench Builds on Systems provided by I/PRO and Internet Media Services, 1995 business Wire, Inc., May 31, 1995, 3 pages.

Dillon et al., Marketing research in a Marketing Environment, 1987, Times Mirror/Mosby College, USA, pp. 98, 286, 288.

Greffenstette et al., "Validating the coverage of lexical resources for affect analysis and automatically classifying new words along semantic axes," Chap. X, Mar. 2004, pp. 1-15.

Harabagiu, Sanda M., "An Intelligent System for Question Answering", University of Southern California; Modlovan, Dan, Southern Methodist University, 2004, pp. 1-5.

Harabagiu, Sanda M. et al., "Experiments with Open-Domain Textual Question Asnwering", Department of Computer Science and Engineering at Southern Methodist Universtity, 2000, pp. 1-7.

Harabagiu, Sanda M. et al., "Mining Textual Answers with Knowledge-Based Indicators", Department of Computer Science and Engineering at Southern MethodistC University, 2000, pp. 1-5.

Joachims, Thorsten, "Text categorization with support vector machines: Learning with many relevant features," in Machine Learning: ECML-98, Tenth European Conference on Machine Learning, pp. 137-142, 1998.

Kleppner, Advertising Procedure, 6th edition, 1977, Prentice-Hall, Inc., Englewood Cliffs, NJ, p. 492.

Kotler, Marketing Management, 1997, PrenticeHall International Inc., Upper Saddle River, NJ, pp. 617-619, 656-658, 665-667.

Lenz, Mario, et al., "Question answering with Textual CBR", Department of Computer Science, Humboldt University Berlin, D-10099 Berlin, pp. 1-12, 1998.

Littlestone, Nick, "Learning quickly when irrelevant attributes abound: A new linear-threshold algorithm," in Machine Learning, 1988, pp. 285-318, vol. 2, Kluwer Academic Publishers, Boston, USA.

McLachlan, Geoffrey J. and Krishnan, Thriyambakam, The EM Algorithm and Extensions, Copyright 1997, pp. 1-274, John Wiley & Sons, Inc., New York, USA.

Modlovan, Dan et al., "LASSO: A Tool for Surfing the Answer Net", Department of Computer Science and Engineering at Southern Methodist University, pp. 1-9, 1999.

Reinartz, Customer Lifetime Value Analysis: An Integrated Empirical Framework for Measurement and Explanation, dissertation: Apr. 1999, pp. 57-118.

Thomas, International Marketing, 1971, International Textbook Company, Scranton, PA, p. 148.

Tull et al., Marketing Research Measurement and Method, 1984, MacMillan Publishing Company, New York, NY, pp. 102, 103, 114, 115, 200 201 and 256.

Voorhees, Ellen M., "The TREC-8 Question Answering Track Report", National Institute of Standards and Technology, pp. 1-6, 1999.

Word of Mouth Research Case Study, "The Trans Fat Issue, Analysis of online consumer conversation to understand hwo the Oreo lawsuit impacted word-of-mouth on trans fats.", Aug. 16, 2004, 35 pages.

Yang, Yiming, "An evaluation of statistical approacches to text categorization," Information Retrieval 1 (1/2), pp. 67-88, 1999.

p. 34 of archived version of www.zagat.com, Feb. 1999.

International Bureau, "International Preliminary Report on Patentability", from corresponding International Patent Application No. PCT/IL2006/000905, mailed on Jul. 2, 2007, (5 pages).

Notice of Allowance issued in U.S. Appl. No. 11/897,984, mailed Oct. 7, 2009, 10 pages.

Notice of Allowance dated Nov. 21, 2007, in U.S. Appl. No. 11/239,696, 3 pages.

Official Action dated Nov. 22, 2005, in U.S. Appl. No. 09/686,516, 25 pages.

Official Action dated Oct. 3, 2007, in U.S. Appl. No. 11/710,742, 10 pages.

Official Action dated Sep. 22, 2006, in U.S. Appl. No. 11/239,696, 11 pages.

Notice of Allowance dated Sep. 21, 2006, in U.S. Appl. No. 11/239,695, 3 pages.

Notice of Allowance issued in U.S. Appl. No. 11/710,742, mailed Jun. 8, 2009, 10 pages.

Official Action dated Jan. 21, 2009, in U.S. Appl. No. 11/897,984, 3 pages.

Official Action dated Nov. 13, 2008, in U.S. Appl. No. 11/897,984, 20 pages.

Office Action issued in U.S. Appl. No. 10/801,758, mailed Apr. 29, 2009, 42 pages.

Official Action dated May 22, 2008, in U.S. Appl. No. 11/897,984, 17 pages.

U.S. Office Action, issued in U.S. Appl. No. 11/710,743, mailed Aug. 7, 2009, 19 pages.

Official Action, issued in U.S. Appl. No. 11/710,743. mailed Jan. 8, 2010, 23 pages.

Official Action, issued in U.S. Appl. No. 11/710,742. mailed Jan. 5, 2010, 9 pages.

Adamic et al., The political blogosphere and the 2004 U.S. election: Divided they blog, Proceedings WWW-2005 2nd Annual Workshop on the Weblogging Ecosystem, 2005, Chiba, Japan, pp. 1-16.

Adar et al., Implicit structure and dynamics of blogspace, Proceedings WWW-2004 Workshop on the Weblogging Ecosystem, 2004, New York, NY, pp. 1-8.

Archived version of www.bizrate.com, Jan. 1999, pp. 1-22.

Dagan et al., "Mistake Driven learning in text categorization", in EMNLP '97, 2nd Conference on Empirical Methods in Natural Language Processing, 1997, pp. 1-9.

www.dialogic.com as archived on May 12, 2000, pp. 1-34.

eWatch's archived web site retrieved from [URL:http://web.archive.org/web/19980522190526/wwww.ewatch.com] on Sep. 8, 2004, archived May 22, 1998, pp. 1-50.

Farber, Dave. "IP: eWatch and Cybersleuth," Jun. 29, 2000, retrieved from [URL: http://www.interesting-people.org/archives/interesting-people/200006/msg00090.html], pp. 1-4.

Glance et al., Analyzing online disussion for marketing intelligence, Proceedings WWW-2005 2nd Annual Workshop on the Weblogging Ecosystem, 2005, Chiba, Japan, pp. 1-2.

Glance et al., Deriving marketing intelligence from online discussion, 11th ACM SIGKDD International Conf. on Knowledge Discovery and Data Mining, Aug. 21-24, 2005, Chicago, IL, pp. 1-10.

Kahn et al., Categorizing Web Documents using Competitive Learning;An ingredient of a Personal Adaptive Agent, IEEE;c 1997, pp. 1-4.

Katz, Boris, "From Sentence Processing to Information Access on the World Wide Web: Start Information Server", MIT Artificial Intelligence Laboratory, Feb. 27, 1997, pp. 1-20.

Marlow, Audience, structure and authority in the weblog community, International Communication Association Conference, MIT Media Laboratory, 2004, New Orleans, LA, pp. 1-9.

McLachlan, Geoffrey J. And Krishnan, Thriyambakam, The EM Algorithm and Extensions, Copyright 1997, pp. 1-274, John Wiley & Sons, Inc., New York, USA, pp. 1-61.

Nakashima et al., Information Filtering for the Newspaper, IEE; c1997, pp. 1-4.

Nanno et al., Automatic collection and monitoring of Japanese Weblogs, Proceedings WWW-2004 Workshop on the weblogging Ecosystem, 2004, New York, NY, pp. 1-7.

NetCurrent's web site, retrieved from [URL: http://web.archive.org/web/20000622024845/www/netcurrents.com] Jan. 17, 2005, archived on Jun. 22, 2000 and Sep. 18, 2000, pp. 1-17.

Pang et al., "Thumbs up? Sentiment classification using machine learning techniques," in Proceedings of EMNLP 2002, pp. 1-8.

Trigaux, Robert. "Cyberwar Erupts Over Free Speech Across Florida, Nation. "Knight-Ridder Tribune Business News, May 29, 2000, pp. 1-4.

Wiebe et al., "Identifying collocations for recognizing opinions, in proceedings of ACL/EACL '01 workshop on collcation," (Toulouse, France), Jul. 2001, pp. 1-9.

www.zagat.com archived on Apr. 29, 1999, pp. 1-33.

* cited by examiner

Criteria Questionnaire

- A usage statement about the product itself — unsure ▶
- A brand comparison involving the product's price — unsure ▶
- A usage statement about a feature of the product — unsure ▶
- A brand comparison involving advertising for the product — unsure ▶
- A factual description of a news article mentioning the product — unsure ▶
- A brand comparison involving corporate activity by the company — unsure ▶

Next >

1. Project Info
2. Data Sources
3. Product Category
4. Customer
5. Competitors
6. Counter-examples
7. Criteria Question...
8. Labeling Criteria
9. Criteria Document
10. Load messages
11. Label messages
12. Compute expecte...
13. Expected perfor...
14. Done Please answer a series of questions about what makes messages relevant. You will see several screens of questions depending on your answers.

Take Criteria Questionnaire

Proceed with caution if you have already defined criteria. Taking the questionnaire will delete all existing criteria < Prev    Next >    Exit

| ◯ Analyst Workbench | |
|---|---|
| File  Import  Benchmark  Target  Polarity  Topic  Phrase | |

| Project | Import | Benchmark | Target | Polarity | Topic | Phrase |
|---|---|---|---|---|---|---|

| Summary | Label | Performance |
|---|---|---|

Subject: Brighthand reviews the Sony CLIE PEG-NZ90    Engine: discussion.brighthand.com
Date: Tue Feb 04 00:00:00 EST 2003    Forum: Reviews
From: Covert +>
+>
+>
+>
+>Originally posted by hepv
+>
+>Anyway...how come we don't have any PPC manufactures making these cool multimedia centric devices (niche).

We did - they were Casio. Casio pioneered PDA multimedia with its Palm PCs and first Pocket PC, but now they're agree that someone needs to step up and release a Pocket PC that has added multimedia value over other PPC's. I 39xx screen, old E-125/Maestro joypad, removable battery, Zayo speed, etc...), I'd buy it.

---------------------------------
Covert of www.cghm.Bk.com

View Raw Document       View Logic

Labelling doc #5 (Unlabelled)

FIG. 12

METHOD FOR DEVELOPING A CLASSIFIER FOR CLASSIFYING COMMUNICATIONS

BACKGROUND

The present invention is a computer assisted/implemented tool that allows a non machine learning expert to build text classifiers. The present invention is also directed to the task of building Internet message relevancy filters.

The full end-to-end process of building a new text classifier is traditionally an expensive and time-consuming undertaking. One prior approach was to divide the end-to-end process into a series of steps managed by people with different levels of expertise. Typically, the process goes as follows: (1) a domain expert/programmer/machine-learning expert (DEPMLE) collects unlabeled communications (such as, for example, text messages posted on an Internet message board); (2) the DEPMLE writes a document describing the labeling criteria; (3) hourly workers with minimal computer expertise label a set of communications; (4) a data quality manager reviews the labeling to ensure consistency; and (5) the DEPMLE takes the labeled communications and custom-builds a text classifier and gives reasonable bounds on its accuracy and performance. This process typically takes several weeks to perform.

Traditional text mining software simplifies the process by removing the need for a machine learning expert. The software allows a tool expert to provide labeled training communications to a black box that produces a text classifier with known bounds on its accuracy and performance. This approach does not cover the complete end-to-end process because it skips entirely over the cumbersome step of collecting the communications and labeling them in a consistent fashion.

The traditional approach for labeling data for training a text classifier presents to the user for labeling, sets of randomly-selected training communications (un-labeled communications). Some of the user-labeled communications (the "training set") are then used to "train" the text classifier through machine learning processes. The rest of the user-labeled communications (the "test set") are then automatically labeled by the text classifier and compared to the user-provided labels to determine known bounds on the classifier's accuracy and performance. This approach suffers in two ways. First, it is inefficient, because better results can be achieved by labeling smaller but cleverly-selected training and test sets. For example, if a classifier is already very sure of the label of a specific unlabeled training example, it is often a waste of time to have a human label it. The traditional approach to solving this problem is called Active Learning, where an algorithm selects which examples get labeled by a person. The second problem with human labeling is that it is inaccurate. Even the most careful labelers make an astonishingly high number of errors. These errors are usually quite pathological to training a classifier. For example, when building message relevancy filters, a very significant fraction of time may be spent relabeling the messages given by a prior art Active Learning tool.

SUMMARY

The present invention is directed to a computer assisted/implemented method for developing a classifier for classifying communications (such as text messages, documents and other types of communications, electronic or otherwise). While the exemplary embodiments described herein are oriented specifically toward the task of building message relevancy filters, the present invention also provides a framework for building many types of classifiers. The present invention is further directed to a computer or computer system (or any similar device or collection of devices) operating a software program including instructions for implementing such a method, or to a computer memory (resident within a computer or portable) containing a software program including instructions for implementing such a method.

Use of the computerized tool according to the exemplary embodiment of the present invention comprises roughly four stages, where these stages are designed to be iterative: (1) a stage defining where and how to harvest messages (i.e., from Internet message boards and the like), which also defines an expected domain of application for the classifier; (2) a guided question/answering stage for the computerized tool to elicit the user's criteria for determining whether a message is relevant or irrelevant; (3) a labeling stage where the user examines carefully-selected messages and provides feedback about whether or not it is relevant and sometimes also what elements of the criteria were used to make the decision; and (4) a performance evaluation stage where parameters of the classifier training are optimized, the best classifier is produced, and known performance bounds are calculated. In the guided question/answering stage, the criteria are parameterized in such a way that (a) they can be operationalized into the text classifier through key words and phrases, and (b) a human-readable English criteria can be produced, which can be reviewed and edited. The labeling phase is heavily oriented toward an extended Active Learning framework. That is, the exemplary embodiment decides which example messages to show the user based upon what category of messages the system thinks would be most useful to the Active Learning process.

The exemplary embodiment of the present invention enables a domain expert (such as a client services account manager) with basic computer skills to perform all functions needed to build a new text classifier, all the way from message collection to criteria building, labeling, and deployment of a new text classifier with known performance characteristics. The tool cleverly manages message harvesting, consistent criteria development, labeling of messages, and proper machine learning protocol. It is envisioned that this end-to-end process will take less than a day instead of weeks as required by the prior art. Much of the speed-up comes in the automation of steps such as harvesting, criteria development, consistent data quality checks, and machine learning training. Some of the speed-up also comes by cleverly minimizing the number of messages that need to be labeled, which is possible because, in this exemplary embodiment, a single tool oversees both the labeling and the training of the algorithm. Some of the speed-up also comes because communications and coordination required between the different parties involved in building a prior-art classifier is removed. Only one person is necessary for building the classifier of the exemplary embodiment.

The present invention provides two primary advancements for this novel approach: (1) an advanced Active Learning process that combines, in the exemplary embodiment, Active Learning for training set building, relabeling for data quality and test-set building all into a single process; and (2) structured criteria elicitation, which involves a question/answer process to a generate a clear expression of labeling criteria that is crucial in message classification.

Consequently, it is a first aspect of the current invention to provide a computer assisted/implemented method (or a computer/system or a computer memory containing software that includes instructions for implementing a method) for developing a classifier for classifying communications (text, electronic, etc.) that includes the steps of: (a) presenting communications to a user for labeling as relevant or irrelevant, where the communications are selected from groups of communications including: (i) a training set group of communications, where the training set group of communications is selected by a traditional Active Learning algorithm; (ii) a test set group of communications, where the test set group of communications' is for testing the accuracy of a current state of the classifier being developed by the present method; (iii) a faulty set of communications determined to be previously mislabeled by the user; (iv) a random set of communications previously labeled by the user; and (v) a system-labeled set of communications previously labeled by the system; and (b) developing a classifier for classifying communications based upon the relevant/irrelevant labels assigned by the user during the presenting step. In a more detailed embodiment, the presenting step includes the steps of: assessing the value that labeling a set of communications from each group will provide to the classifier being developed; and selecting a next group for labeling based upon the greatest respective value that will be provided to the classifier being developed from the assessing step.

It is a second aspect of the present invention to provide a computer assisted/implemented method (or a computer/system or a computer memory containing software that includes instructions for implementing a method) for developing a classifier for classifying communications (text, electronic, etc.) that includes the steps of: (a) presenting communications to a user for labeling as relevant or irrelevant, where the communications are selected from groups of communications including: (i) a training set group of communications, where the training set group of communications is selected by traditional Active Learning algorithms; (ii) a test set group of communications, where the test set group of communications is for testing the accuracy of a current state of the classifier being developed by the present method; and (iii) a previously-labeled set of communications previously labeled by the user, the system and/or another user; and (b) developing a classifier for classifying communications based upon the relevant/irrelevant labels assigned by the user during the presenting step. In a more detailed embodiment, the previously labeled set of communications includes communications previously labeled by the user. In a further detailed embodiment, the previously labeled set of communications includes communications determined to be possibly mislabeled by the user.

In an alternate detailed embodiment of the second aspect of the present invention, the previously-labeled set of communications may include communications previously labeled by the system. In a further detailed embodiment, the previously-labeled set of communications includes communications previously labeled by a user and communications previously labeled by the system.

It is also within the scope of the second aspect of the present invention that the presenting step includes the steps of: assessing a value that labeling a set of communications from each group will provide to the classifier being developed; and selecting the next group for labeling based upon the greatest respect of value that will be provided to the classifier being developed from the assessing step. It is also within the scope of the second aspect of the present invention that the method further includes the step of developing an expression of labeling criteria in an interactive session with the user.

A third aspect of the present invention is directed to a computer assisted/implemented method (or a computer/system or a computer memory containing software that includes instructions for implementing a method) for developing a classifier for classifying communications (text, electronic, etc.) that includes the steps of: (a) developing an expression of labeling criteria in an interactive session with the user; (b) presenting communications to the user for labeling as relevant or irrelevant; and (c) developing a classifier for classifying communications based upon the relevant/irrelevant labels assigned by the user during the presenting step. In a more detailed embodiment, the interactive session includes the steps of posing hypothetical questions to the user regarding what type of information the user would consider relevant. In a more detailed embodiment, the hypothetical questions illicit "yes", "no" and "unsure" responses (or their equivalents) from the user. It is within the scope of the invention that the subsequent questions are based, at least in part, upon answers given to previous questions. It is also within the scope of the third aspect of the present invention that the step of developing an expression for labeling criteria produces a criteria document; where this criteria document may include a list of items that are considered relevant and a list of things that are considered irrelevant. It is also within the scope of the third aspect of the present invention that the expression and/or the criteria document include a group of key words and phrases for use by the system in automatically labeling communications. It is also within the third aspect of the present invention that the labeling step (b) includes the step of querying the user as to which items influence the label on a user-labeled communication. Finally, it is within the scope of the third aspect of the present invention that the interactive session is conducted prior to the presenting step (b).

A fourth aspect of the present invention is directed to a computer assisted/implemented method (or a computer/system or a computer memory containing software that includes instructions for implementing a method) for developing a classifier for classifying communications (text, electronic, etc.) that includes the steps of: (a) defining a domain of communications on which the classifier is going to operate; (b) collecting a set of communications from the domain; (c) eliciting labeling communication criteria from a user; (d) labeling, by the system, communications from the set of communications according, at least in part, to the labeling communication criteria elicited from the user; (e) labeling, by the user, communications from the set of communications; and (f) building a communications classifier according to a combination of labels applied to communications in labeling steps (d) and (e). In a more detailed embodiment the combination of the labeling steps (d) and (e), and the building step (f) includes the step of selecting communications for labeling by the user targeted to build the communications classifier within known performance bounds.

BRIEF DESCRIPTION OF THE DRAWINGS

FIG. 7 is a screen-shot of a next step in an exemplary embodiment of the present invention;

FIG. 12 is a screen-shot of an example message labeled by the user according to an exemplary embodiment of the present invention.

DETAILED DESCRIPTION

Figure 1:
FIG. 1 is a screen-shot of an initial step in an exemplary embodiment of the present invention.

The present invention is directed to a computer assisted/implemented method for developing a classifier for classifying communications (such as text messages, documents and other types of communications, electronic or otherwise). The present invention is further directed to a computer or computer system (or any similar device or collection of devices), as known or available to those of ordinary skill in the art, operating a software program including instructions for implementing such a method; or to a computer memory (resident within a computer or portable), as known or available to those of ordinary skill in the art, containing a software program including instructions for implementing such a method. While the exemplary embodiments described herein are oriented specifically toward the task of building Internet message relevancy filters, the present invention also provides a framework for building many types of communication/information classifiers.

Use of the computerized tool according to the exemplary embodiment of the present invention comprises roughly four stages, where these stages are designed to be iterative: (1) a stage defining where and how to harvest messages (i.e., from Internet message boards and the like), which also defines an expected domain of application for the classifier; (2) a guided question/answering stage for the computerized tool to elicit the user's criteria for determining whether a message is relevant or irrelevant; (3) a labeling stage where the user examines carefully-selected messages and provides feedback about whether or not it is relevant and sometimes also what elements of the criteria were used to make the decision; and (4) a performance evaluation stage where parameters of the classifier training are optimized, the best classifier is produced, and known performance bounds are calculated. In the guided question/answering stage, the criteria are parameterized in such a way that (a) they can be operationalized into the text classifier through key words and phrases, and (b) a human-readable English criteria can be produced, which can be reviewed and edited. The labeling phase is heavily oriented toward an extended Active Learning framework. That is, the exemplary embodiment decides which example messages to show the user based upon what category of messages the system thinks would be most useful to the Active Learning process.

The exemplary embodiment of the present invention enables a domain expert (such as a client services account manager) with basic computer skills to perform all functions needed to build a new text classifier, all the way from message collection to criteria building, labeling, and deployment of a new text classifier with known performance characteristics. The tool cleverly manages message harvesting, consistent criteria development, labeling of messages, and proper machine learning protocol. It is envisioned that this end-to-end process will take less than a day instead of weeks as required by the prior art. Much of the speed-up comes in the automation of steps such as harvesting, criteria development, consistent data quality checks, and machine learning training. Some of the speed-up also comes by cleverly minimizing the number of messages that need to be labeled, which is possible because, in the exemplary embodiment, a single tool oversees both the labeling and the training of the algorithm. Some of the speed-up also comes because communications and coordination required between the different parties involved in building a prior-art classifier is removed. Only one person is necessary for building the classifier of the exemplary embodiment.

The present invention provides two primary advancements for this novel approach: (1) an advanced Active Learning process that combines, in the exemplary embodiment, Active Learning for training set building, relabeling for data quality and test-set building all into a single process; and (2) structured criteria elicitation, which involves a question/answer process to a generate a clear expression of labeling criteria that is crucial in message classification.

Advanced Active Learning

The advanced Active Learning process combines, in the exemplary embodiment, Active Learning for training set building, relabeling for data quality, and test set building all into a single process. During the labeling process, the tool chooses which messages, sets of messages and/or categories of messages to present to the human labeler by balancing the relative importance of the above three types of labeling (training set building, relabeling and test set building). More specifically, the exemplary embodiment of the tool chooses between five different labeling categories of messages that may be selectively presented to the human labeler based upon the greatest respective value that labeling messages of the respective category will provide to the classifier being developed during this process. These five different types of labeling categories are as follows: (1) a training set group of messages, where the training set group of messages is selected by a traditional Active Learning algorithm; (5) a system-labeled set of messages previously labeled by the tool used to augment the training set while training the text classifier; (3) a test set group of messages, where the test set group of messages is used for testing the accuracy of a current state of classifier being developed; (4) a faulty set of messages suspected by the system to be previously mislabeled by the user; and (5) a random set of messages previously labeled by the user used to estimate how error-prone the human labeler may be.

The Training Set Group of Messages The traditional Active Learning algorithm selects messages/examples that, along with their user-provided label, will help the classifier do a better job classifying in the future. There are many selection criteria available in the literature, and they include things like: picking a message about which the classifier is very uncertain, picking a message that is similar to many other messages, picking a message that statistically is expected to teach a lot, etc.

The System-Labeled Set of Messages The system-labeled set of messages, which have been previously automatically labeled by the classifier, may be provided to the human labeler to see if the tool needs to correct any errors in the automatic key word matching labeling process. The key words are automatically derived from the criteria elicitation process discussed below. The tool currently seeds the training phase of the exemplary embodiment with a set of example messages that have been automatically labeled by simple key word matching. This often provides a good starting point, but there are going to be mistakes in the key word labeling. By presenting these to the human labeler for review, the tool can correct any errors here.

The Test Set Group of Messages The test set group of messages is a randomly chosen test set example. This set will be used to evaluate how the current classifier is performing. More precisely, statistical confidence bounds can be placed on the current accuracy, Precision/Recall Break Even, F-1 or other performance measures of the classifier. It is desired to maximize the 95% confidence lower bound of the classifier. By adding more test set examples, the system allows the region of confidence to be tighter, which raises the lower bound on performance. For example, if a classifier is performing at 80%±5%, processing a new test set message may be found to improve the variance to 80%±3%.

The Faulty Set of Messages This set of messages is essentially a bad-looking example previously shown to the user. This set is based upon the understanding that there are almost always inconsistencies with human labeling of communications. These inconsistencies can be very damaging to some classification algorithms. Some of these inconsistencies are easy to spot by the tool. For example, a communication that the classifier thinks is relevant but the human labeler labeled as irrelevant may often-times be a labeling mistake. By showing these examples again to the user, the tool can correct some of these mistakes and improve the classification.

The Randomly-Selected Set of Messages The randomly-selected set of messages, which have been previously labeled by the human labeler, may be provided to the human labeler for labeling again to estimate how consistent the labeler is labeling messages. By understanding how consistent the labeling is being conducted by the labeler, the tool will know how aggressively to try to correct labeling. In turn, by showing some randomly-selected examples, the tool can judge how frequently it should show sets of communications that it determines are likely to be faultily labeled communications for relabeling.

Recognizing that labeling the above-discussed five categories of messages is valuable, the next determination for the system is when to send a particular category of messages to the human labeler and in what proportions. This is determined by mathematically expressing (in terms of improvement to expected lower bound on measured performance of the classifier) the additional value for labeling each category of messages. This will give the tool a priority for presenting each category of messages to the user for labeling. Of course, these priorities will change over time. For example, when just starting out, it is more important to label test sets of messages, because without labeling test sets the system cannot measure the overall performance. After some time, the test set will be large enough that adding to it is less important, and at this point, it is likely that other categories of labels will become relatively more important. In its simplest form, the rates of labeling from the different sets of messages can just be fixed to set percentages. This does not give optimal performance, but it is computationally easier.

Labeling an additional Test Set message increases the expected lower bound on measured performance by making the error bars on the expectation smaller because the error would be measured over a larger set of data. The value of labeling such a message can be calculated by the expected decrease in the size of the error bars.

Labeling an additional Training Set message increases the expected lower bound on measured performance by improving the expected measured performance because it provides an additional training example to the learning algorithm. The value of labeling such a message could be calculated by measuring the expected gain in performance as predicted by the active labeling algorithm. It could also be calculated by measuring the slope of the learning curve as more data is labeled.

Labeling a Faulty message increases the expected lower bound on measured performance by improving the expected measured performance because it changes the label of a training (or test) example that was proving difficult for the classifier to incorporate. The value of labeling such a message can be calculated by measuring the improvement in classifier performance if the label were changed, multiplied by the probability the label will be changed, as estimated from the number of labeling changes from previously labeling Faulty messages and Randomly Selected messages.

Labeling a System-Labeled message increases the expected lower bound on measured performance by improving the expected measured performance because sometimes it will correct the label assigned by the system. The value of labeling such a message could be calculated by measuring the improvement in classifier performance if the label were changed, multiplied by the probability the label will be changed, as estimated from the frequency that previously-labeled System-Labeled messages have had their label changed.

Labeling a Randomly-Selected message indirectly increases the expected lower bound on measured performance. The value of labeling such a message lies in accurately estimating the error rate, which determines how aggressively to label Faulty messages. The rate of which Randomly-Selected messages are labeled can be calculated using the lower-bound on the expected frequency that Faulty messages get their labeling changes.

Consequently, it is a first aspect of the current invention to provide a computer assisted/implemented method (or a computer/system or a computer memory containing software that includes instructions for implementing a method) for developing a classifier for classifying communications that includes the steps of: (a) presenting communications to a user for labeling as relevant or irrelevant, where the communications are selected from groups of communications including: (i) a training set group of communications, where the training set group of communications is selected by a traditional Active Learning algorithm; (ii) a system-labeled set of communications previously labeled by the system; (iii) a test set group of communications, where the test set group of communications is for testing the accuracy of a current state of the classifier being developed by the present method; (iv) a faulty set of communications suspected by the system to be previously mislabeled by the user; and (v) a random set of communications previously labeled by the user; and (b) developing a classifier for classifying communications based upon the relevant/irrelevant labels assigned by the user during the presenting step. In a more detailed embodiment, the presenting step includes the steps of: assessing the value that labeling a set of communications from each group will provide to the classifier being developed; and selecting a next group for labeling based upon the greatest respective value that will be provided to the classifier being developed from the assessing step.

It is a second aspect of the present invention to provide a computer assisted/implemented method (or a computer/system or a computer memory containing software that includes instructions for implementing a method) for developing a classifier for classifying communications that includes the steps of: (a) presenting communications to a user for labeling as relevant or irrelevant, where the communications are selected from groups of communications including: (i) a training set group of communications, where the training set group of communications is selected by traditional Active Learning algorithms; (ii) a test set group of communications, where the test set group of communications is for testing the accuracy of a current state of the classifier being developed by the present method; and (iii) a previously labeled set of communications previously labeled by the user, the system and/or another user; and (b) developing a classifier for classifying communications based upon the relevant/irrelevant labels assigned by the user during the presenting step. In a more detailed embodiment, the previously labeled set of communications includes communications previously labeled by the user. In a further detailed embodiment, the previously labeled set of communications includes communications determined to be possibly mislabeled by the user.

In an alternate detailed embodiment of the second aspect of the present invention, the previously-labeled set of communications may include communications previously labeled by the system. In a further detailed embodiment, the previously-labeled set of communications includes communications previously labeled by a user and communications previously labeled by the system.

It is also within the scope of the second aspect of the present invention that the presenting step includes the steps of: assessing a value that labeling a set of communications from each group will provide to the classifier being developed; and selecting the next group for labeling based upon the greatest respect of value that will be provided to the classifier being developed from the assessing step. It is also within the scope of the second aspect of the present invention that the method further includes the step of developing an expression of labeling criteria in an interactive session with the user. This will be described in further detail below.

Structured Criteria Elicitation\

Structured criteria elicitation is based upon the idea that a clear expression of labeling criteria is crucial in a message classification process. By enforcing an elicitation stage before the labeling stage, the exemplary embodiment can make sure that the user has clearly defined in their mind (and to the tool) what they mean by relevant and irrelevant documents/messages/communications. The exemplary embodiment of the present invention provides a novel and interesting way to conduct this efficiently, and it is a powerful technique for ensuring that the labeling process proceeds smoothly and gives consistent results.

The exemplary embodiment defines a structured formalism in the message relevancy domain that guides the criteria elicitation. A full relevancy criteria is viewed as a series of bullet items. Each bullet item is a tuple: [product; aspect; strength; relevancy; key words]. To give a simple example:

The tuple representing the concept "any message discussing the Nissan 350Z Charity Auction is relevant" is: [Nissan 350Z; corporate activity; discussions and opinions; irrelevant, "charity auction"]

By viewing labeling criteria bullet items as a point in a structured domain, specifying a labeling criteria then becomes a search for the separator (between relevant and irrelevant communications) in the space of all criteria. By cleverly posing hypothetical questions to the user during criteria elicitation, the exemplary embodiment of the present invention can efficiently search this space and construct the criteria specification automatically from a set of "yes/no/unsure" questions posed to the user. During this process the user also supplies key words and phrases with each criteria specific dimension. As introduced above, in addition to adding to the criteria specification, such keywords may also be utilized by the system to collect groups of Internet messages using a keyword Web search during an initial message collection stage.

For internet messages about a specific consumer product, we have discovered that most labeling criteria can be expressed with several structured dimensions. The first dimension is which product is being discussed. This could be the product (such as the Nissan 350z) or a set of competitors (such as the Honda S2000). The second dimension is the aspect being discussed for the selected product. This could be a feature of the product (such as the headlights), corporate activity by the product's company, advertising about the product, etc. The third dimension is what type of discussion or mention of the product and aspect is occurring. The weakest discussion is a casual mention of the product. A stronger mention is a factual description of the product. An even stronger mention is a stated opinion of the product or a comparison of the product to its competitors. Relevance criteria specify a certain strength of discussion for each aspect of a product that is required to make it relevant.

We believe that most relevance criteria, even those for other text classification tasks, can be specified in this multi-dimensional way with the appropriate set of dimensions. By posing these criteria in this multi-dimensional way, a structured questionnaire will efficiently elicit the criteria from the human.

In the exemplary implementation of the invention, Internet message relevancy filters for marketing analysis, the first dimension (the topic) question segment is either:
  "the product"
  "the competitors"

In the exemplary embodiment, we often ignore the differentiation between the product and the competitors. The second dimension (the aspect of the topic) question segment is either:
  "a feature of the product"
  "the product itself"
  "corporate activity by the company"
  "the product's price"
  "a news article mentioning the product"
  "advertising for the product"

The third dimension (the type of discussion) question segment is either:
  "a casual mention of"
  "a factual description of"
  "a usage statement about"
  "a brand comparison involving"
  "an opinion about"

The questionnaire, in the exemplary embodiment, is built using combinations of terms taken from the three dimensions introduced above. For example, the question: "Is a brand comparison involving corporate activity by the company of the competitors relevant, irrelevant or are you unsure?" is built using the third dimension (type of discussion) segment "a brand comparison involving", the second dimension (aspect of the topic) segment "corporate activity by the company" and the first dimension (topic) segment "the competitors". Some combinations do not make sense for every aspect. For example, it does not really make sense to build a question about: "a usage statement about corporate activity by the company". Consequently, in the exemplary embodiment, the following second and third dimension combinations are permitted:

| Second Dimension | Permitted Third Dimension |
|---|---|
| a feature | MENTION, DESCRIPTION, USAGE, COMPARISON, OPINION |
| the product itself | MENTION, DESCRIPTION, USAGE, COMPARISON, OPINION |
| corporate activity | DESCRIPTION, COMPARISON, OPINION |
| Price | DESCRIPTION, COMPARISON, OPINION |
| News | MENTION, DESCRIPTION, OPINION |
| Advertising | MENTION, DESCRIPTION, COMPARISON, OPINION |

In the exemplary embodiment, criteria elicitation is a questionnaire, where the later questions are created based upon the answers to the earlier questions. For example, one early question might be, "Is a factual description of a feature of the product relevant?". If the answer is no, a follow-up question might be, "Is an opinion about a feature of the product relevant?". lathe answer is yes, a more appropriate question would be, "Is a casual mention of a feature of a product relevant?". Basically, each question builds upon the previous one, pushing the boundaries until the system sees a cross-over from relevancy or irrelevancy or vice-versa.

The end result of the user answering the questions provided by the questionnaire is a criteria document, which is a human-readable bulleted list defining the types of things that are relevant and the types of things that are irrelevant. This document is good for external review. The document is also used inside the tool. The key words defined for each bullet item help pre-seed what types of phrases to look for in the feature extraction. They are also used to pre-label some examples based on key word and phrase matching. During labeling, the tool may periodically ask the user to identify which bullet items were used to label a specific example. This can be used to refine the set of key words, and also to ensure the consistency of the labeling by the user.

Additionally, with the exemplary embodiment, after the questionnaire is provided to the user, the user is given the opportunity to add new values for the second dimension, although it has been found that this does not occur very often.

Consequently, it can be seen that a third aspect of the present invention is directed to a computer assisted/implemented method for developing a classifier for classifying communications that includes the steps of: (a) developing an expression of labeling criteria in an interactive session with the user; (b) presenting communications to the user for labeling as relevant or irrelevant; and (c) developing a classifier for classifying communications based upon the relevant/irrelevant labels assigned by the user during the presenting step. In a more detailed embodiment, the interactive session includes the steps of posing hypothetical questions to the user regarding what type of information the user would consider relevant. In a more detailed embodiment, the hypothetical questions elicit "yes", "no" and "unsure" responses (or their equivalents) from the user. It is within the scope of the invention that the subsequent questions are based, at least in part, upon answers given to previous questions. It is also within the scope of the third aspect of the present invention that the step of developing an expression for labeling criteria produces a criteria document; where this criteria document may include a list of items that are considered relevant and a list of things that are considered irrelevant. It is also within the scope of the third aspect of the present invention that the expression and/or the criteria document include a group of key words and phrases for use by the system in automatically labeling communications. It is also within the third aspect of the present invention that the labeling step (b) includes the step of querying the user as to which items influence the label on a user-labeled communication. Finally, it is within the scope of the third aspect of the present invention that the interactive session is conducted prior to the presenting step (b).

Figure 13:
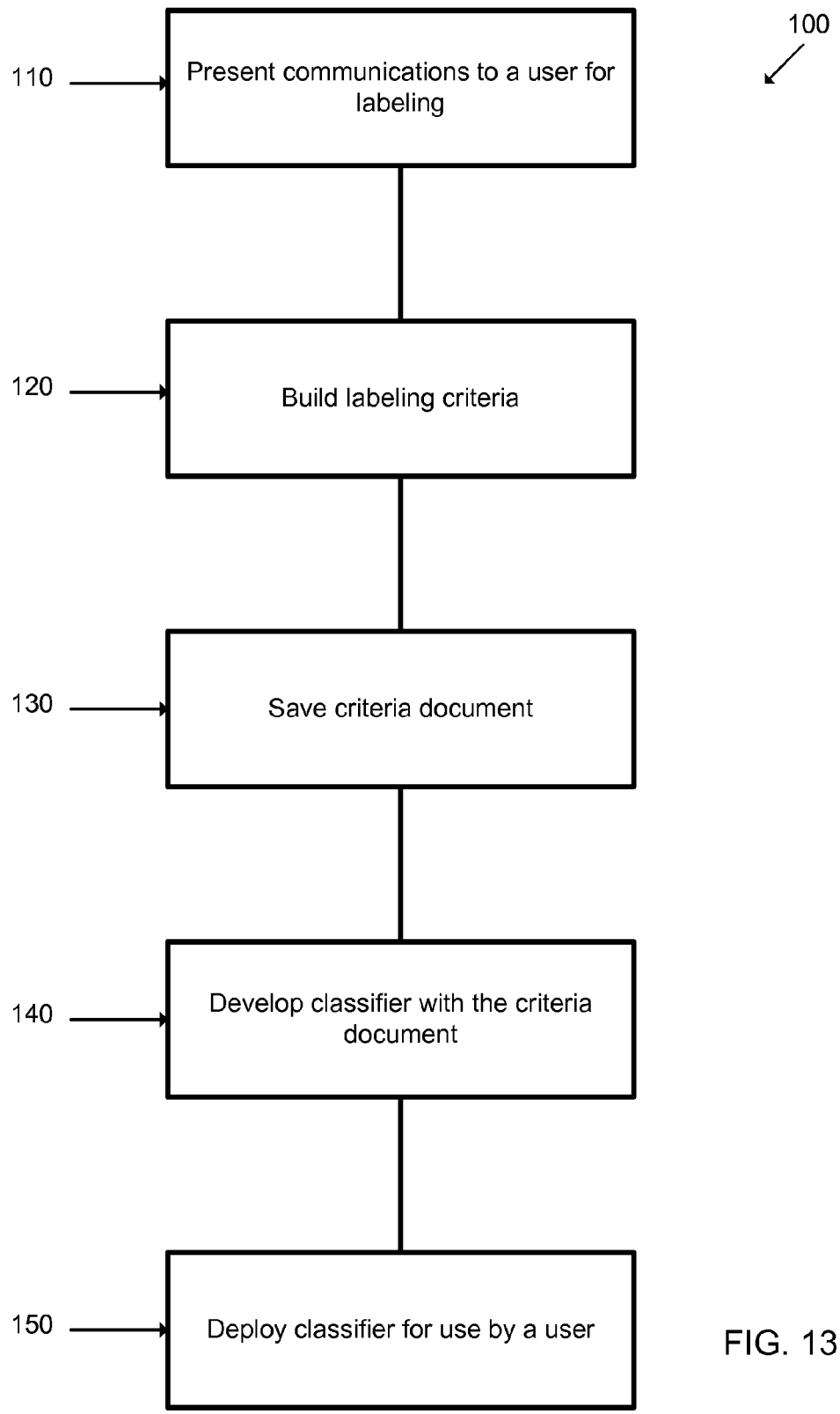
FIG. 13 is a flow diagram for a method for developing a classifier for classifying communication according to an embodiment of the present invention.

As shown in FIG. 13, certain embodiments described above implement a method 100 for developing and deploying a classifier for classifying communication according to an embodiment of the present invention. Certain embodiments of the method 100 can be implemented using a computer. Certain embodiments of the method 100 can be implemented as a set of instructions in a software program contained in a computer memory. At step 110, communications are presented to a user for labeling. Communications can be selected from groups of communication including, for example, a training set group of communications, the training set group of communications being selected by a traditional active learning algorithm; a system-labeled set of communications previously labeled by the system; a test set group of communications, the test set group of communications for testing the accuracy of a current state of the classifier being developed by the present method; a faulty set of communications suspected to be previously mis-labeled by the user; and a random set of communications previously labeled by the user. At step 120, labeling criteria are build using information input by the user including the user labeling. At step 130, a criteria document is saved based on the labeling criteria. At step 140, a classifier is developed using the criteria document. At step 150, the classifier is deployed to classify communications.

Example End-to-End Process

The following is an example of a graphical process provided by an exemplary embodiment of the present invention to build a new text cl~sifier using the advanced active learning and the structured criteria elicitation processes discussed above.

As shown in FIG. 1, a first step is to query the user of the project name. This project name will be used to later identify the structured criteria document and other related materials.

Figure 2:
FIG. 2 is a screen-shot of a next step in an exemplary embodiment of the present invention.

As shown in FIG. 2, a next step is to request the user to specify a variety of data feeds or sources from which the system will harvest the data. These sources will be used during both training and production. The data sources may be a collection of Internet message or news group messages (or other alternate communications, such as emails, chat room discussions, instant messenger type discussions and the like) previously collected and stored at the specified location, and/or may be the locations (such as Web or NNTP addresses or links) from which messages will be harvested.

Figure 3:
FIG. 3 is a screen-shot of a next step in an exemplary embodiment of the present invention.

As shown in FIG. 3, a next step is to have the user enter a set of phrases that identify, describe or are associated with the general type of product being searched. This is used to define a product category that the present project will focus on.

Figure 4:
FIG. 4 is a screen-shot of a next step in an exemplary embodiment of the present invention.

As shown in FIG. 4, a next step is to request the user to enter a set of phrases that name the customer and their product. These phrases can include specific brand names, for example.

Figure 5:
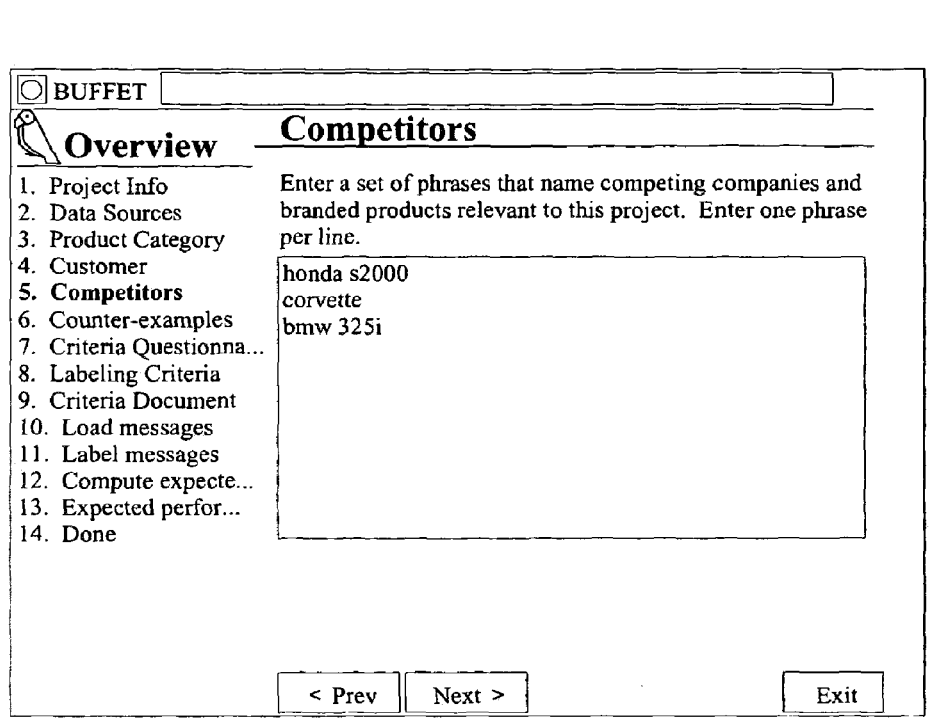
FIG. 5 is a screen-shot of a next step in an exemplary embodiment of the present invention.

As shown in FIG. 5, a next step is to request the user to enter a set of phrases that name competing companies and branded products relevant to the present project.

Figure 6:
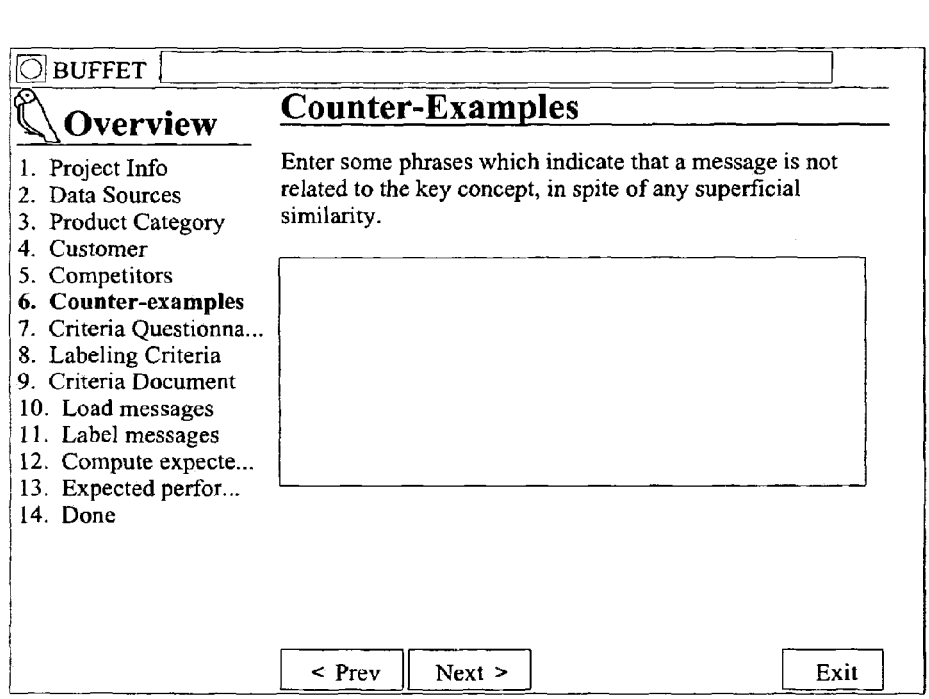
FIG. 6 is a screen-shot of a next step in an exemplary embodiment of the present invention.

As shown in FIG. 6, a next step would be to request the user to enter counterexample phrases that indicate a particular communication is not related to the key concept. For example, in the present example, the user may enter the brand names of popular video game consoles and associated street racing games to eliminate messages that discuss the relevant automobile product in reference to its use in a video game.

Figure 8:
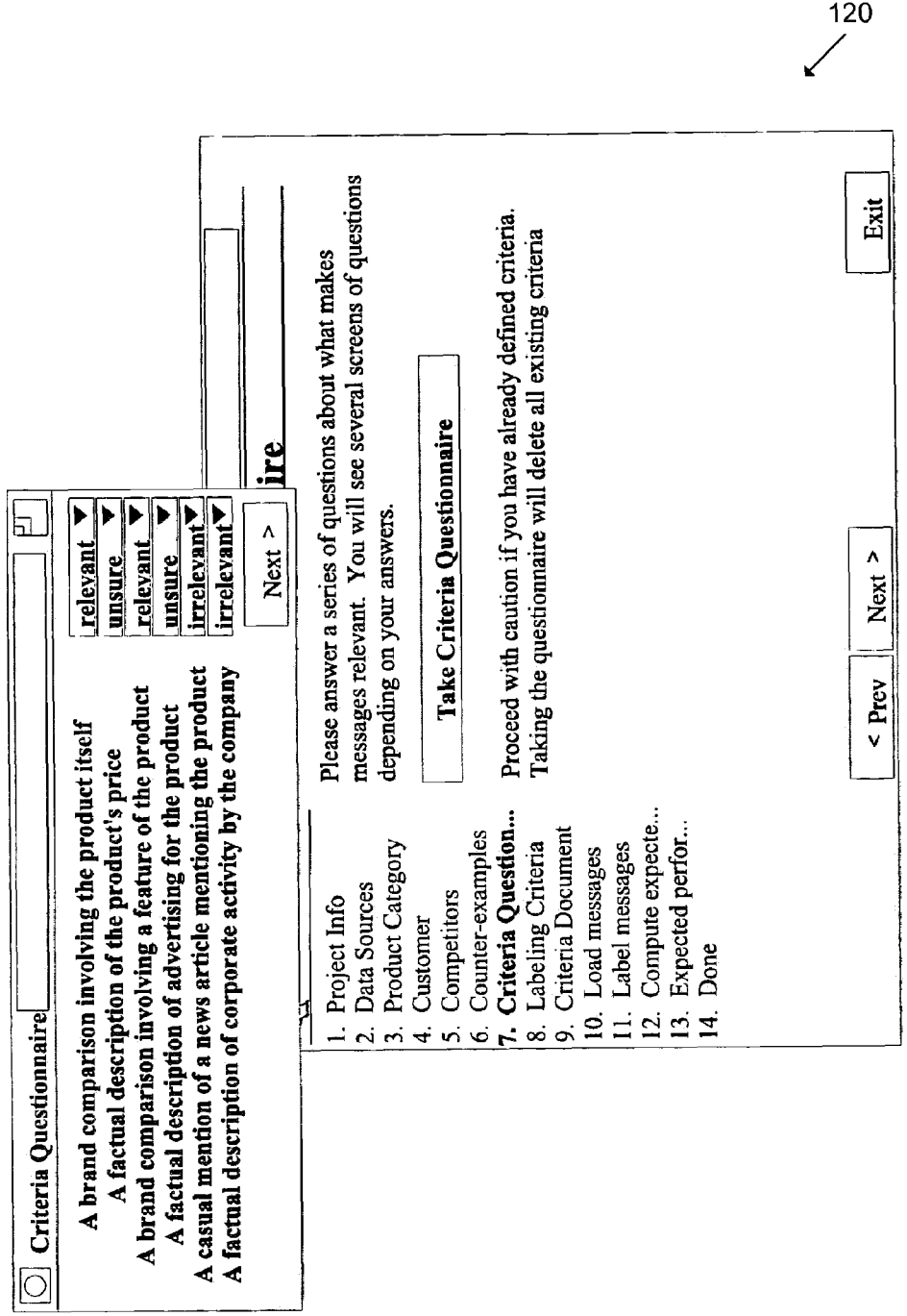
FIG. 8 is a screen-shot of a later stage of the step of FIG. 7 according to an exemplary embodiment of the present invention.

FIG. 7 provides an example of a criteria questionnaire, which asks specific questions to the user whether certain criteria would be "relevant/irrelevant/unsure". For example, as shown in FIG. 8, a brand comparison involving the product itself is considered relevant, a brand comparison involving a feature of the product is considered relevant but a factual description of corporate activity by the company is irrelevant. As discussed above, the specific answers to each of these criteria questions is used by the exemplary embodiment to develop subsequent questions that build upon the answers to the previous questions.

Figure 9:
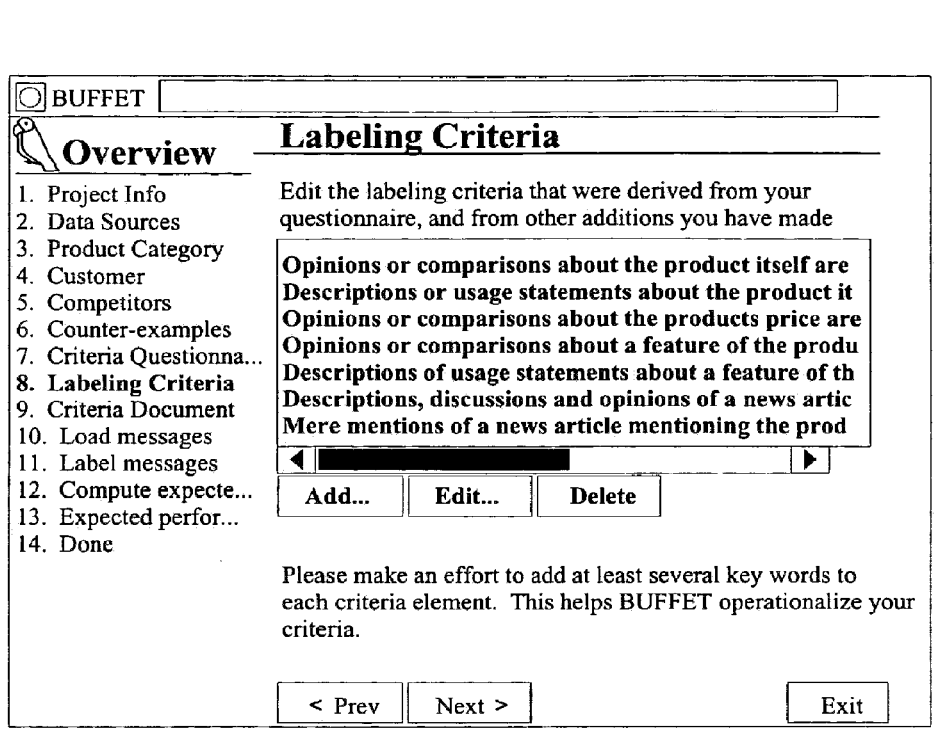
FIG. 9 is a screen-shot of a next step in an exemplary embodiment of the present invention.

As shown in FIG. 9, the answers provided by the user to this questionnaire will be used to build a set of labeling criteria. This set of labeling criteria is used so that the user can verify the labeling criteria that was defined as a result of the questionnaire and to also refine the labeling criteria. As introduced above, at this stage, the user is given the opportunity to add keywords to each criteria element to enhance the tool's performance. This refinement can involve adding key words to each criteria element, changing the relevancy or tone of the criteria statements or deleting any statement entirely.

Figure 10:
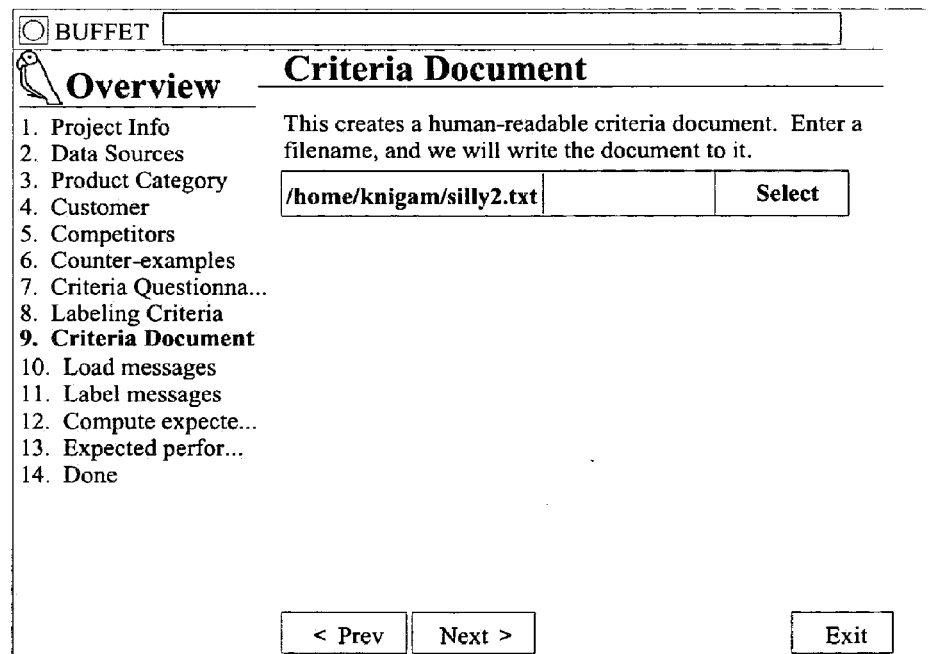
FIG. 10 is a screen-shot of a next step in an exemplary embodiment of the present invention.

As shown in FIG. 10, the present exemplary embodiment will save the human readable criteria statements into a criteria document. As discussed above, this criteria document can help the user verify to himself or herself at any time what he or she originally considered relevant so that subsequent labeling operations can be consistent; and further, the criteria statements are also utilized by the system in automatic labeling.

Figure 11:
FIG. 11 is a screen-shot of a next step in an exemplary embodiment of the present invention.

As shown in FIG. 11, a next step in the exemplary embodiment is to allow the user to begin labeling messages according to the advanced active learning process introduced above. Specifically, the tool chooses which messages, sets of messages and/or categories of messages to present to the human labeler by balancing the relative importance of the above three types of labeling (training set building, relabeling and test set building). FIG. 12 provides an example of a message to be labeled by the user. As can be seen in FIG. 12, certain key words have been highlighted by the system to give a user a more specific idea of why the system considered this message to be in need of labeling.

Following from the above description and invention summaries, it should be apparent to those of ordinary skill in the art that, while the systems and processes herein described constitute exemplary embodiments of the present invention, it is understood that the invention is not limited to these precise systems and processes and that changes may be made therein without departing from the scope of the invention as defined by the following claims. Additionally, it is to be understood that the invention is defined by the claims and it is not intended that any limitations or elements describing the exemplary embodiments set forth herein are to be incorporated into the meanings of the claims unless such limitations or elements are explicitly listed in the claims. Likewise, it is to be understood thaL it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A computer implemented method for developing a classifier for classifying electronic communications comprising:
   querying a user for a phrase that indicates that a communication is not related to a concept;
   receiving a user identification of the phrase;
   (a) presenting user-generated electronic communications to a user for labeling as relevant or irrelevant, the electronic communications being selected from groups of electronic communications including:
      a training set group of electronic communications, the training set group of electronic communications being selected by an active learning algorithm;
      a system-labeled set of electronic communications previously labeled by the system;
      a test set group of electronic communications, the test set group of electronic communications for testing the accuracy of a current state of a classifier being developed;
      a faulty set of electronic communications suspected to be previously mis-labeled by the user; and
      a random set of electronic communications previously labeled by the user;
   (b) developing the classifier for classifying electronic communications based upon the phrase, the relevant labels and the irrelevant labels assigned by the user during the presenting of the electronic communications to the user;
   (c) deploying the classifier for use in classifying electronic communications based upon the relevant labels and the irrelevant labels; and
   (d) storing a set of electronic communications labeled by the classifier in a memory.

2. The method of claim 1, wherein the presenting of the electronic communications to the user includes:
   assessing a first value related to performance that labeling a first set of electronic communications from a first one of the training set group, the system-labeled set, the test set group, the faulty set, or the random set provides to the classifier being developed;
   assessing a second value related to performance that labeling a second set of electronic communications from a second one of the training set group, the system-labeled set, the test set group, the faulty set, or the random set provides to the classifier being developed; and
   selecting a next group for labeling based upon a greatest of the first value and the second value provided to the classifier being developed from the assessing.

3. A computer implemented method for developing a classifier for classifying electronic communications comprising:
   querying a user for a phrase that indicates that a communication is not related to a concept;
   receiving a user identification of the phrase;
   (a) presenting electronic communications to a user for labeling as relevant or irrelevant, the electronic communications being selected from groups of user-generated electronic communications including:
      a training set group of electronic communications, the training set group of electronic communications being selected by an active learning algorithm;
      a test set group of electronic communications, the test set group of electronic communications for testing the accuracy of a current state of a classifier being developed; and
      a previously-labeled set of electronic communications previously labeled by at least one of the user, the system and another user;
   (b) developing the classifier for classifying electronic communications based upon the phrase and the relevant labels and the irrelevant labels assigned by the user;
   (c) deploying the classifier for use in classifying electronic communications based upon the relevant labels and the irrelevant labels; and
   (d) storing a set of electronic communications labeled by the classifier in a memory.

4. The method of claim 3, wherein the previously-labeled set of electronic communications includes electronic communications previously labeled by the user.

5. The method of claim 4, wherein the previously-labeled set of electronic communications includes electronic communications suspected by the system to be possibly mis-labeled by the user.

6. The method of claim 3, wherein the previously-labeled set of electronic communications includes electronic communications previously labeled by the system.

7. The method of claim 3, wherein the previously-labeled set of electronic communications includes electronic communications previously labeled by a user and electronic communications previously labeled by the system.

8. The method of claim 3 wherein presenting the electronic communications to the user includes:
   assessing a first value that labeling a first set of electronic communications from a first one of the training set group, the system-labeled set, the test set group, the faulty set, or the random set will provide to the classifier being developed;
   assessing a second value related to performance that labeling a second set of electronic communications from a second one of the training set group, the system-labeled set, the test set group, the faulty set, or the random set provides to the classifier being developed; and
   selecting a next group for labeling based upon the greatest of the first value and the second value that will be provided to the classifier being developed from the assessing.

9. The method of claim 3 wherein presenting the electronic communications to the user includes:
   assessing a value that labeling a set of electronic communications from each group will provide to the classifier being developed; and
   selecting a next group for labeling based upon achieving known performance bounds for the classifier.

10. The method of claim 3 further comprising developing an expression of labeling criteria in an interactive session with the user.

11. The method of claim 10, wherein the interactive session includes posing hypothetical questions to the user regarding what type of information the user would consider relevant.

12. The method of claim 11, wherein the hypothetical questions elicit "yes", "no" and "unsure" responses from the user.

13. The method of claim 11 wherein subsequent questions are based, at least in part, upon the answers given to previous questions.

14. The method of claim 11 wherein developing an expression of labeling criteria produces a criteria document.

15. The method of claim 14 wherein the expression and/or the criteria document include a group of keywords and/or phrases for use by the system in automatically labeling electronic communications.

16. The method of claim 10 wherein developing an expression of labeling criteria produces a criteria document.

17. The method of claim 16 wherein the criteria document includes a list of items that are considered relevant and a list of items that are considered irrelevant.

18. The method of claim 17, wherein presenting the electronic communications to the user includes querying the user to identify which item(s) influenced the label on a user-labeled electronic communication.

19. The method of claim 16, wherein at least one of the expression or the criteria document include at least one of a group of keywords or phrases for use by the system in automatically labeling electronic communications.

20. The method of claim 10 wherein the interactive session is conducted prior to presenting the electronic communications to the user.

21. A computer implemented method for developing a classifier for classifying electronic communications comprising:
   (a) developing an expression of labeling criteria in an interactive session with a user, wherein the interactive session includes querying a user to identify a phrase that indicates that a communication is not related to a concept and receiving a user identification of the phrase;
   (b) presenting electronic communications to the user for labeling as relevant or irrelevant, wherein the electronic communications are user-generated;
   (c) developing a classifier for classifying electronic communications based upon the phrase and the relevant labels and the irrelevant labels assigned by the user;
   (d) deploying the classifier for use in classifying electronic communications based upon the phrase and the relevant labels and the irrelevant labels;
   (e) storing a set of electronic communications labeled by the classifier in a memory; and
   wherein at least one of (b) and (c) use the expression of labeling criteria developed in (a).

22. The method of claim 21, wherein the interactive session includes posing questions to the user regarding what type of information the user would consider relevant.

23. The method of claim 22, wherein the questions elicit "yes", "no" and "unsure" responses from the user.

24. The method of claim 22 wherein subsequent questions are based, at least in part, upon the answers given to previous questions.

25. The method of claim 22 wherein the questions are structured from several dimensional levels of relevance, including a first dimension of question segments on a topic, a second dimension of question segments on an aspect of the topic and a third dimension of question segments on a type of discussion.

26. The method of claim 25, wherein:
   the first dimension of question segments on a topic include one or more of the following segments: a first segment concerning a client's product and a second segment concerning a client's competitors;
   the second dimension of question segments on a topic include one or more of the following segments: a third segment concerning a feature of the topic, a fourth segment concerning the topic itself, a fifth segment concerning corporate activity of the topic, a sixth segment concerning price of the topic, a seventh segment concerning news of the topic and an eighth segment concerning advertising of the topic; and
   the third dimension of question segments on a topic include one or more of the following segments: a ninth segment concerning a mention of the second dimension segment, a tenth segment concerning a description of the second dimension segment, an eleventh segment concerning a usage statement about the second dimension segment, a twelfth segment concerning a brand comparison involving the second dimension of questions segments, and a thirteenth segment concerning an opinion about the second dimension segment.

27. The method of claim 21 wherein developing the expression of labeling criteria produces a criteria document.

28. The method of claim 27 wherein the criteria document includes a list of items that are considered relevant and a list of items that are considered irrelevant.

29. The method of claim 28 wherein the criteria document includes a group of keywords for use by the system in automatically labeling electronic communications.

30. The method of claim 28, wherein presenting the electronic communications to the user includes querying the user which items influenced the label on a user-labeled communication.

31. The method of claim 21 wherein the expression of labeling criteria includes a group of keywords and/or phrases for use by the system in automatically labeling electronic communications.

32. The method of claim 31 wherein the group of keywords is also for use by the system in gathering electronic communications.

33. A computer implemented method for developing a classifier for classifying electronic communications comprising:
   (a) defining a domain of electronic communications on which a classifier is to operate, wherein the electronic communications are user-generated;
   (b) collecting a set of electronic communications from the domain;
   (c) eliciting labeling criteria from a user by querying a user to identify a phrase that indicates that a communication is not related to a concept and receiving the phrase;
   (d) labeling, by the system, electronic communications from the set of electronic communications according, at least in part, to the labeling criteria elicited from the user;
   (e) labeling, by the user, electronic communications from the set of electronic communications;
   (f) building the electronic communications classifier according to a combination of labels applied to electronic communications in (d) and (e);
   (g) deploying the classifier for use in classifying electronic communications based upon the combination of labels; and
   (h) storing a labeled set of electronic communications labeled by the classifier in a memory.

34. The computer implemented method of claim 33, wherein (d) and (e), and (f) includes selecting electronic communications for labeling by the user targeted to build the electronic communications classifier within known performance bounds.

35. The computer implemented method of claim 34, wherein selecting electronic communications for labeling by the user selects electronic communications from groups of electronic communications including:
   a training set group of electronic communications, the training set group of electronic communications being selected by an active learning algorithm;
   a test set group of electronic communications for testing the accuracy of a current state of the classifier; and
   a previously-labeled set of electronic communications previously labeled by at least one of the user, the system and another user.

36. The computer implemented method of claim 34, wherein selecting electronic communications for labeling by the user selects electronic communications from groups of electronic communications including:
   a training set group of electronic communications selected by an active learning algorithm;
   a system-labeled set of electronic communications previously labeled by the system;
   a test set group of electronic communications for testing the accuracy of a current state of the classifier being developed;
   a faulty set of electronic communications suspected to be previously mis-labeled by the user; and
   a random set of electronic communications previously labeled by the user.

37. The computer implemented method of claim 33, wherein the labeling criteria elicited in the eliciting of (c) is used, in part, to determine electronic communications to collect in the collecting of (b).

38. The computer implemented method of claim 37, wherein the eliciting (c) involves an interactive session with the user.

39. The computer implemented method of claim 37, wherein the labeling criteria elicited in the eliciting (c) is used, in part, by the system to label electronic communications in the labeling (d).

40. The computer implemented method of claim 39, wherein the eliciting (c) involves an interactive session with the user.

41. The method of claim 33, wherein the building (f) involves an active learning process.

42. The computer implemented method of claim 33, wherein the labeling criteria elicited in the eliciting (c) is used, in part, by the system to label electronic communications in the labeling (d).

43. The computer implemented method of claim 33, wherein the eliciting (c) involves an interactive session with the user.

44. The method of claim 43, wherein the interactive session includes posing questions to the user regarding what type of information the user would consider relevant.

45. The method of claim 44, wherein the interactive session also allows the user to provide keywords based upon a criteria the user considers relevant.

46. The method of claim 44, wherein the questions elicit "yes", "no" and "unsure" responses from the user.

47. The method of claim 43, wherein the building (f) involves an active learning process.

48. A tangible computer readable medium storing instructions that when executed cause a computer to develop a classifier for classifying electronic communications by:
   querying a user to identify a phrase that indicates that a communication is not related to a concept;
   receiving a user identification of the phrase;
   (a) presenting electronic communications to a user for labeling as relevant or irrelevant, the electronic communications being selected from groups of user-generated electronic communications including:
      a training set group of electronic communications selected by an active learning algorithm;
      a test set group of electronic communications for testing the accuracy of a current state of a classifier being developed; and
      a previously-labeled set of electronic communications previously labeled by at least one of the user, the system and another user;
   (b) developing the classifier for classifying electronic communications based upon the phrase and the relevant labels and the irrelevant labels assigned by the user during presenting electronic communications to the user;
   (c) deploying the classifier for use in classifying electronic communications based upon the relevant labels and the irrelevant labels; and storing a set of electronic communications labeled by the classifier in a memory.

49. A tangible computer readable medium storing instructions that when executed cause a computer to develop a classifier for classifying electronic communications by:
   (a) developing an expression of labeling criteria in an interactive session with the user, wherein the interactive session includes querying a user for a phrase that indicates that a communication is not related to a concept and receiving a user identification of the phrase;
   (b) presenting electronic communications to a user for labeling as relevant or irrelevant, wherein the electronic communications are user-generated; and
   (c) developing a classifier for classifying electronic communications based upon the phrase and the relevant labels and the irrelevant labels assigned by the user;
   (d) deploying the classifier for use in classifying electronic communications based upon the phrase and the relevant labels and the irrelevant labels; and
   storing a set of electronic communications labeled by the classifier in a memory;
   wherein at least one of (b) and (c) use the expression of labeling criteria developed in (a).

50. A tangible computer readable medium storing instructions that when executed cause a computer to develop a classifier for classifying electronic communications by:
   (a) defining a domain of electronic communications on which a classifier is to operate, wherein the electronic communications are user-generated;
   (b) collecting a set of electronic communications from the domain;
   (c) eliciting labeling criteria from a user by querying a user for a phrase that indicates that a communication is not related to a concept and receiving a user identification of the phrase;
   (d) labeling, by the computer system, electronic communications from the set of communications according, at least in part, to the labeling criteria elicited from the user;
   (e) labeling, by the user, electronic communications from the set of electronic communications;
   (f) building the electronic communications classifier according to a combination of labels applied to electronic communications in (d) and (e);
   (g) deploying the classifier for use in classifying electronic communications based upon the combination of labels; and
   storing a set of electronic communications labeled by the classifier in a memory.

* * * * *